United States Patent [19]

Allen et al.

[11] 4,219,429

[45] Aug. 26, 1980

[54] COMPOSITION AND PROCESS FOR STIMULATING WELL PRODUCTION

[75] Inventors: Joseph C. Allen, Bellaire; Jack F. Tate, Houston, both of Tex.

[73] Assignee: Texaco Inc., White Plains, N.Y.

[21] Appl. No.: 908,174

[22] Filed: May 22, 1978

[51] Int. Cl.$^2$ ............................................. E21B 43/27
[52] U.S. Cl. ............................... 252/8.55 C; 166/307; 525/329; 526/264
[58] Field of Search ...................... 252/8.55 C, 8.55 R; 166/271, 307; 526/264

[56] References Cited

U.S. PATENT DOCUMENTS

| | | | |
|---|---|---|---|
| 2,596,137 | 5/1952 | Fast | 252/8.55 X |
| 2,763,326 | 9/1956 | Cardwell | 166/307 |
| 3,679,000 | 7/1972 | Kaufman | 252/8.55 X |
| 3,791,446 | 2/1974 | Tate | 166/307 |
| 3,923,666 | 12/1975 | Dill | 252/8.55 |

*Primary Examiner*—Herbert B. Guynn
*Attorney, Agent, or Firm*—Carl G. Ries; Thomas H. Whaley; Walter D. Hunter

[57] ABSTRACT

The production of hydrocarbons from a subterranean hydrocarbon-bearing formation containing acid-soluble components, such as one composed at least in part of dolomite or limestone, is stimulated by injecting into the formation usually via casing and cement pack perforations a composition comprising an aqueous solution of a mineral acid having dissolved therein a small amount of a vinylpyrrolidone terpolymer. The increase in the permeability and porosity of the formation achieved utilizing the method of invention results in a substantial improvement in hydrocarbon recovery. Optionally, the injected composition may be saturated with natural gas at the injection pressure.

10 Claims, No Drawings

COMPOSITION AND PROCESS FOR STIMULATING WELL PRODUCTION

FIELD OF THE INVENTION

This invention relates to a method for stimulating the production of fluids from earthen formations. More particularly, this invention relates to a method in which the permeability and porosity of a hydrocarbon-bearing formation containing acid-soluble components and with or without water-sensitive clays or shales are improved on treatment of the formation with an aqueous solution of a vinylpyrrolidone polymer and a mineral acid.

DESCRIPTION OF THE PRIOR ART

The technique of increasing the permeability of a subterranean hydrocarbon-bearing formation for the purpose of stimulating the production of fluids therefrom has long been practiced in the art. One such method commonly employed is known as acidizing which is widely utilized in treating subsurface calcareous geological formations, e.g., limestone, dolomite, etc. In the usual well-acidizing procedure, a non-oxidizing mineral acid is introduced into the well and under sufficient pressure is forced into the adjacent subterranean formation where it reacts with acid-reactive components, particularly the carbonates such as calcium carbonate, magnesium carbonate, etc., to form the respective salt of the acid, carbon dioxide and water. The usual acid employed in such acidization procedures is hydrochloric acid.

During the process passageways for fluid flow are created or existing passageways therein are enlarged thus stimulating the production of oil, water, brines and various gases. If desired, the acidization may be carried out at an injection pressure sufficiently great to create fractures in the strata or formation which has the desired advantage of opening up passageways into the formation along which the acid can travel to more remote areas from the well bore. The salt formed is extensively water soluble and is readily removed by reverse flow from the formation via the well bore.

There are, however, disadvantages attending the use of hydrochloric acid or other similar non-oxidizing mineral acids. For example, these strong aqueous acids have almost instantaneous rates of reaction with the carbonates contained in the formation. The acid, therefore, necessarily spends itself in the formation immediately adjacent the well bore so little beneficial effect is realized at any great distance from the well bore within the formation under treatment. These strong aqueous acids also may cause channeling, cavitation and eventual collapse of the formation immediately adjacent the well bore due to excessively rapid action of the acid. In addition, subsurface equipment may be damaged severely by strong acid attack.

One suggested solution to overcome these disadvantages has been the use of "retarded" acids which consist of a mineral acid and an additive which emulsifies the acid the combination of which affects the acidization rate. However, although such emulsified mixtures can be displaced into a formation before substantial reaction occurs, they have the inherent disadvantage that when the emulsion breaks and they do react, they usually react swiftly, often unpredictably, and without substantially resolving the problem of cavitation.

A later development in acidizing wells has been the use of potentially acidic materials which are capable of producing a strong aqueous acid by means of a chemical reaction at a more or less constant rate over a period of time and which subsequently reacts with the formation to enhance porosity and permeability. However, with aqueous systems containing these potentially acidic materials, the effectiveness of the acidizing operation too often is negated in subterranean hydrocarbon-bearing formations which contain water-sensitive clays or shales. These water-sensitive shales react or interact with the aqueous medium to swell, which results in decreasing formation permeability which might have been realized by the action of the potentially acidic material. In fact, it has been found that the net effect of the swelling of water-sensitive clays often may result in an overall decrease in formation permeability following the acidization.

The use of cross-linked copolymers of polyvinylpyrrolidone and polyacrylamides, polyurethanes, etc. to give materials which are insoluble in aqueous mineral acid solutions is described in U.S. Pat. No. 3,380,529 to Hendrickson. Such insoluble, cross-linked polymers are utilized as agents for partially plugging channels developed during acidization treatment in order to effect acidic attack at greater distances from the well bore. In U.S. Pat. No. 3,434,971 a similar acidization process is described in which a copolymer prepared by polymerizing acrylamide and N-vinylpyrrolidone in the presence of a cross-linking agent, such as N,N'-methylenebisacrylamide, is disclosed. These copolymers are insoluble in the aqueous mineral acid solutions employed in acidization operations and are utilized as dispersion in the acid solutions. Both of the previously mentioned acidization processes which utilize insoluble, cross-linked copolymers are distinctly different from the novel method of this invention in which a vinylpyrrolidone polymer soluble in aqueous mineral acid solutions is used.

It is therefore, the principal object of the present invention to overcome the defects of the prior art in acidizing fluid bearing formations such as hydrocarbon-bearing formations, etc., by providing a method utilizing the novel acidizing composition of this invention in which the distance to which the acidizing composition penetrates the formation before becoming spent is extended, thus providing in depth-acidization.

Another object of this invention is to provide a method of acidization employing the novel composition of this invention which is effective in preventing the swelling of water-sensitive clays and shales.

Another object of this invention is to provide a high viscosity acidizing fluid containing in solution a vinylpyrrolidone polymer which is stable over long periods of time and in which the polymer constituent does not hydrolyze or otherwise decompose on storage thus avoiding the simultaneous reduction in viscosity and effectiveness in acidization in-depth operations.

SUMMARY OF THE INVENTION

This invention encompasses and includes a method of increasing the production of fluids from a subterranean fluid-bearing formation having present acid-soluble components and with or without water-sensitive clays or shales, comprising injecting down the well bore penetrating said formation and injecting therefrom into said formation under a pressure greater than formation pressure an aqueous acidizing composition, maintaining said composition in contact with the formation strata for a time sufficient for the acid to chemically react with the acid-soluble components of the formation to etch or enlarge passageways therethrough thereby increasing substantially the flow capacity of the said subterranean formation.

The novel acidizing composition of this invention comprises an aqueous solution of a non-oxidizing mineral acid, such as hydrochloric, sulfuric, etc., having dissolved therein a small amount of a vinylpyrrolidone polymer. The amount of acid present in the subject composition is such that it is capable of reacting with acid-soluble components of the fluid-bearing strata.

DETAILED DESCRIPTION OF THE INVENTION

In its broadest embodiment the method of the present invention comprises introducing into a subsurface calcareous formation an acid solution of a water-soluble vinylpyrrolidone polymer wherein the said solution is maintained in contact with the formation for a time sufficient to chemically react with the formation so as to increase substantially the flow capabilities of the formation and to release carbon dioxide concomitantly whereby a beneficial effect due to the mutual miscibility of carbon dioxide in the fluid phases is realized as a reduction in viscosity and retentive capillary forces, while another beneficial effect is realized in the form of increased formation energy, due to the pressure generated by the released carbon dioxide.

A number of advantages result in employing the novel composition of this invention in acidizing calcareous fluid-bearing formations, namely:

(1) The reaction rate of the acid with the formation acid-solubles, such as carbonates, dolomites, etc., is greatly lessened. One of the most serious problems encountered in the use of mineral acids as acidizing agents is the very rapid rate with which the known acidizing compositions react with such acid-soluble so that little actual effect takes places at any great distance from the well.

(2) The viscosity of the acidizing fluid is increased. Such a viscosity increase is characteristic of fluid-loss agents often used in acidizing formulations to cause more uniform formation penetration and minimize leakage into zones of high permeability or into natural fractures.

(3) The cited polymer is highly effective in preventing swelling of water-sensitive clays or shales and thus formation damage of this type during acidization is largely avoided.

The process of this invention is especially useful in preventing destruction of oil well cement packs. Following the drilling of an oil and/or gas well, the casing is set and cemented. The cementing is usually accomplished by the pumping of cement down the inside of the casing (from surface), and out its end, so that cement flows upward between the outside casing wall and formation. The casing is often cemented to the surface, but always well through the production zone. After the cement sets, casing and cement are perforated in order to contact the inside of the casing with the producing formation.

In an acidization procedure, such as an acid stimulation process, high pressure may be required to permit entry of the acid into the formation. This is especially true when permeability is low. If fracturing is required, the usually high overburden pressure must be exceeded to cleave the formation. Such high pressures may divert the acid through the perforations, up (or down) the outside of the casing, through the cement (which is acid-soluble) and into non-productive zones, or perhaps worse, zones which produce only water. Two unfortunate effects may be derived from this diversion: (1) the cement pack is weakened or destroyed, reducing the mechanical integrity of the producing system, and (2) zones of high water production may begin to produce; the water moving up (or down) the outside of the casing from the aquifer to the perforations.

One embodiment of this invention which is especially useful in preventing the destruction of cement packs in acid-type well stimulation processes comprises the following steps:

(1) injecting into the formation via the casing (and/or workover tubing string) and through the casing and cement perforations at a pressure below fracture pressure an acidic polymer solution comprising aqueous solution of a mineral acid, such as hydrochloric acid, having dissolved therein a small amount of a vinylpyrrolidone polymer;

(2) continuing the injection of the aqueous solution of step (1) into the formation while gradually increasing the pressure and therefore the entry rate into the formation, and (3) finally injecting the aqueous solution of step (1) at a pressure sufficient to fracture the formation.

During step (1) the pressure applied against the formation by the fluid should, preferably, be no greater than to overcome the formation pressure and slowly force the acidic solution into the formation.

The vinylpyrrolidone polymer employed in the acid solution severely retards the reaction rate of mineral acid with calcareous material, and has been shown to permit flow of the mineral acid through a cement matrix without appreciable damage thereto when the vinylpyrrolidone polymer is incorporated therein. The vinylpyrrolidone polymer serves the purpose of permitting more uniform etching of the formation face, greater penetration before spending, and less damage to the cement. The treatment under low pressure encourages etching of the formation instead of destruction of the cement bond, and will expose a greater area to ensuing acid treatment, permitting more acid to enter the producing formation. In conducting this process, step (1) is continued until receptivity of the formation increases to the desired level. During step (2) the formation will be etched even more, reducing the ultimate breakdown pressure since the retarding effect of the acid will permit passageways (i.e., chemical fracturing) to be developed and the retarded acid will not be spent at the wellbore. Finally, increasing the pressure in step (3) to that required to part the overburden, will result in mechanical fracturing which augments the chemical etching. The pressure of step (3) should be considerably less than that required in conventional acid stimulation processes. Optionally, in this last step, a propping agent such as sand, etc. may be added to the acidizing composition.

Preferably, the acidic polymer solution of this invention is one comprising an aqueous solution of about 3 to about 30 percent by weight of a non-oxidizing mineral acid, which may or may not include brine, and which preferably contains dissolved therein between about 0.1 to about 10 percent by weight based on the total solution weight of the water-soluble vinylpyrrolidone polymer.

Generally, the acidic polymer solution will contain an inhibitor to prevent or greatly reduce the corrosive attack of the acid on metal. Any of a wide variety of compounds known in the art and employed for this purpose can be used, e.g., certain compounds of arsenic, nitrogen or sulfur as described by Grebe et al in U.S. Pat. No. 1,877,504 or a rosin amine type as described in U.S. Pat. No. 2,758,970. The amount of the inhibitor utilized is not highly critical and it may be varied widely. Usually this amount is defined as a small but effective amount, e.g., from 0.02 percent to about 2.0 percent by weight or more of the acidic polymer solution.

Water-soluble vinylpyrrolidone polymers useful in preparing the novel acidizing compositions of this invention include the following terpolymers:

(A) Vinylpyrrolidone-vinyl acetate-2-acrylamido-2-methylpropanesulfonic acid (B) Vinylpyrrolidone-hydroxyethyl acrylate-2-acrylamido-2-methylpropanesulfonic acid and (C) Terpolymer A or B alkoxylated with from 2 to about 100 weight percent of ethylene oxide.

Terpolymer A comprises repeating units of

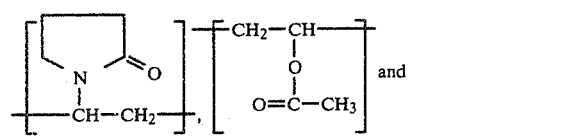

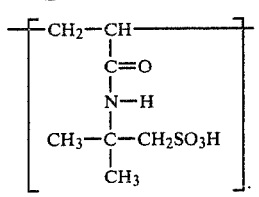

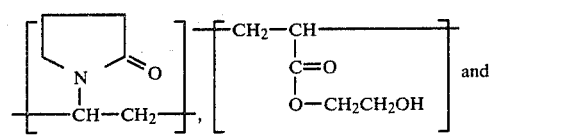

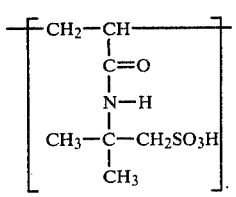

The terpolymers employed in this invention can be conveniently prepared by the usual vinyl compound polymerization methods at temperatures of about 30° to about 100° C. employing a suitable polymerization catalyst such as azo-bis-(isobutyronitrile), ammonium persulfate, etc. The preparation of such vinyl-type polymers is described in detail in numerous patents including U.S. Pat. Nos. 3,264,272, 3,779,917, 3,405,003, etc.

In Terpolymer A the weight percent of vinylpyrrolidone units will vary from about 65 to about 80, the weight percent of vinyl acetate units from about 8 to about 15 and with the balance being 2-acrylamido-2-methylpropanesulfonic acid units. Likewise in Terpolymer B the weight percent of vinylpyrrolidone units will vary from about 65 to about 80, the weight percent of hydroxyethyl acrylate units from 8 to about 15 and with the balance being 2-acrylamido-2-methylpropanesulfonic acid. Generally, the number average molecular weight of Terpolymers A and B and their alkoxylated derivatives useful in preparing the acidizing compositions of this invention will range from about 10,000 to about 2,000,000 or more and preferably will be from about 100,000 to about 400,000.

The alkoxylated terpolymers employed in preparing the acidizing compositions of this invention comprise the Terpolymer A or B alkoxylated with from about 2 to about 100 percent by weight of ethylene oxide or with a mixture of ethylene oxide and propylene oxide wherein the weight percent of ethylene oxide in the said mixture is about 60 to about 95.

The alkoxylation of such terpolymers can be conveniently conducted using methods well known in the art. For example, an aqueous solution of terpolymer comprising about 10 to about 30 weight percent or more of the terpolymer in water or the same amount of the terpolymer dispersed in toluene, xylene, etc., along with about 0.5 weight percent or more of powdered potassium hydroxide or sodium hydroxide is charged to an autoclave and the autoclave and contents heated to a temperature of about 125° to about 200° C. after which the required weight of ethylene oxide or a mixture of ethylene oxide and propylene oxide is pressured with nitrogen into the autoclave over a period of 1 to about 3 hours or more. The autoclave is allowed to cool to room temperature and then vented. The reaction product remaining after being stripped to remove volatile materials yields the water-soluble, alkoxylated terpolymer.

A number of other methods are set out in the art for conducting such alkoxylated reactions including those described in U.S. Pat. Nos. 2,2,31,477, 2,233,381; 2,131,142; 3,879,475; 2,174,761; 2,425,845 and 3,062,747.

The following example which illustrates the preparation of the alkoxylated terpolymers is to be considered not limitative.

EXAMPLE I

A total of 400 cc of xylene, 5 g of powdered potassium hydroxide and 65 g of terpolymer consisting of repeating units of vinylpyrrolidone, vinyl acetate and 2-acrylamido-2-methylpropanesulfonic acid (number average molecular weight of about 270,000) in particulate form are added to an autoclave and stirring is commenced in order to form a slurry or dispersion of the terpolymer and catalyst in the xylene. The autoclave and contents are then heated to a temperature of 120° C. In the terpolymer the weight percent of vinylpyrrolidone units is about 65, the weight percent of vinyl acetate units is about 16 and the balance is 2-acrylamide-2-methylpropanesulfonic acid units. Ethylene oxide in the amount of 42 g is added to the autoclave under nitrogen pressure over a 1.1 hour period during which time the temperature of the autoclave is maintained at 125° C. Next, the autoclave and contents are allowed to cool to room temperature after which the autoclave is vented. The reaction mixture is then stripped of volatiles using a nitrogen purge. The resulting water-soluble product is the vinylpyrrolidone-vinyl acetate-2-acrylamido-2-methylpropane sulfonic acid terpolymer alkoxylated with about 39 weight percent of ethylene oxide.

In carrying out the method of this invention a solution of from about 3 to about 30 percent by weight of the non-oxidizing mineral acid dissolved in water is first prepared. An inhibitor to prevent corrosion of acid on the metal equipment associated with the well is usually added with mixing in the next step. The vinylpyrrolidone polymer in an amount within the stated concentration range is then admixed with the aqueous acid solution employing a blender. The polymer dissolves rather rapidly in the acid solution and the thus-prepared composition is forced, usually via a suitable pumping system, down the well bore, through the casing and cement pack perforations and into contact with the formation to be treated. As those skilled in the art will readily understand, the pressure employed is determined by the nature of the formation, viscosity of the fluid, and other operating variables. As previously pointed out, the acidization method of this invention may be carried out at a pressure sufficient merely to penetrate the formation or it may be of sufficient magnitude to overcome the weight of the overburden and create fractures in the formation. Propping agents, to prop open the fractures as created, for example 20 to 60 mesh sand, in accordance with known fracturing procedures, may be employed in admixture with the aqueous acidic solution. Generally, it is advisable to allow the aqueous acidic polymer solution to remain in contact with the formation until the acid therein has been substantially depleted by reaction with the acid-soluble components of the formation. After this, the substantially spent treating solution is reversed out of the well, i.e., it is allowed to flow back out or to be pumped out of the formation. Further, as those skilled in the art will understand, the concentration of the polymer and acid should be chosen to provide an acidizing fluid of the desired rheological properties. Similarly, the appropriate molecular weight polymer is selected on the same basis.

The following example illustrates one embodiment of this invention and is to be considered not limitative.

EXAMPLE II

A well drilled in a tight limestone formation is treated with an aqueous acidic polymer composition of this invention in order to stimulate oil production. In preparing to treat the producing formation of the well a packer is set at 8120 feet above perforations located in the interval 8150–8160 feet. A solution of 1 percent by weight of a terpolymer having a number average molecular weight of 350,000 and consisting of 71 weight percent vinyl pyrrolidone, 8.5 weight percent vinyl acetate and with the balance being 2-acrylamido-2-methylpropane-sulfonic acid alkoxylated with 12 weight percent of ethylene oxide is prepared by dissolving completely 500 pounds of the polymer in 6000 gallons of 15 percent by weight hydrochloric acid using cyclic turbulent circulation. A conventional corrosion inhibitor and non-emulsifying agent are present in the acid.

In the first part of the stimulation operation, a pad of 2500 gallons of lease water containing 20 gallons of a scale inhibitor initially to prevent post-precipitation of carbonates dissolved in the subsequent acidizing process is pumped into the formation. In the next step, 1000 gallons of conventional 15 percent HCl is pumped into the formation to remove scale in the vicinity of the well bore. In the third step, 4500 gallons of the acidizing mixture previously described is pumped into the formation. Finally, the aqueous acidic polymer solution is displaced into the formation by pumping an additional 20,000 gallons of lease water into it. The well is shut in for about 10 days after treatment and at the end of that time the production is measured and found to be substantially greater than production prior to the acidization treatment.

What is claimed is:

1. A well-acidizing composition comprising an aqueous solution of a mineral acid having dissolved therein a material selected from the group consisting of:

(I) Terpolymer A consisting of repeating units of:

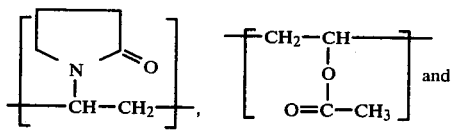

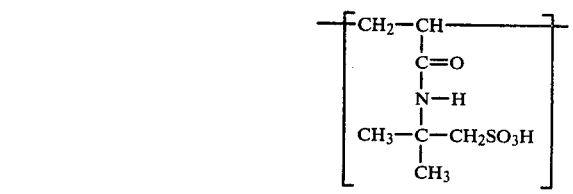

(II) Terpolymer B consisting of repeating units of

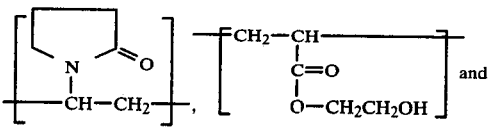

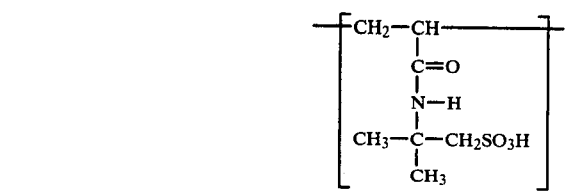

and (III) Terpolymer I or II alkoxylated with about 2 to about 100 weight percent of a substance selected from the group consisting of ethylene oxide and a mixture or ethylene oxide and propylene oxide wherein in the said mixture the weight percent of ethylene oxide ranges from about 60 to about 95, the said mineral acid being present in an amount capable of reacting with the acid-soluble components of a subterranean fluid-bearing formation, wherein in Terpolymer A the weight percent of vinylpyrrolidone units will vary from about 65 to about 80, the weight percent of vinyl acetate units from about 8 to about 15 with the balance being 2-acrylamido-2-methylpropanesulfonic acid, wherein in Terpolymer B the weight percent of vinylpyrrolidone units will vary from about 65 to about 80, the weight percent of hydroxyethyl acrylate units from about 8 to about 15 with the balance being 2-acrylamido-2-methylpropanesulfonic acid, wherein the said terpolymer is present in the said acidic aqueous polymer solution in a concentration of from about 0.1 to about 10 weight percent and wherein the number average molecular weight of the said terpolymer is from about 10,000 to about 2,000,000.

2. The composition of claim 1, wherein the said acid is selected from the group consisting of hydrochloric and sulfuric acid.

3. The composition of claim 1, wherein the said acid is hydrochloric acid.

4. The composition of claim 1, wherein the said terpolymer is dissolved in about 3 to about 30 percent by weight solution of the mineral acid.

5. The composition of claim 1 wherein in the said terpolymer is Terpolymer A.

6. The composition of claim 1 wherein in the said terpolymer is Terpolymer B.

7. The composition of claim 1 wherein the said terpolymer is Terpolymer A or B alkoxylated with about 2 to about 100 weight percent of an agent selected from the group consisting of ethylene oxide and a mixture of ethylene oxide and propylene oxide wherein in the said mixture the weight percent of ethylene oxide ranges from about 60 to about 95.

8. A method of increasing the production of fluids from a subterranean fluid bearing formation having present therein acid-soluble components and optionally water-sensitive shales or clays comprising injecting down the well bore penetrating said formation and injecting therefrom into said formation under a pressure greater than the formation pressure, the composition of claim 1, maintaining said composition in contact with the formation for a time sufficient for the acid to chemically react with the acid-soluble components of the formation to etch passageways therethrough thereby increasing substantially the flow capacity of the said subterranean formation.

9. The method of claim 8 wherein the said formation is a hydrocarbon-bearing formation.

10. A method of increasing the production of fluids from a subterranean fluid-bearing formation penetrated by a well equipped with a casing cemented in place and wherein the casing and cement are perforated to provide communication between the well bore and the fluid-bearing formation comprising:

a. injecting at a low pressure into the formation via the casing and cement perforations the composition of claim 1, b. continuing the injection of the composition of claim 1 into the formation while gradually increasing the injection pressure and therefore the entry rate of the composition into the formation, and c. finally injecting the composition of claim 1 at a pressure sufficient to fracture the formation.

* * * * *